US012487266B2

(12) United States Patent
Lopez Mestre et al.

(10) Patent No.: US 12,487,266 B2
(45) Date of Patent: Dec. 2, 2025

(54) SYSTEM FOR TESTING ELECTRICAL PRODUCTS IN A CLOSED CIRCUIT

(71) Applicant: CINERGIA POWER SOLUTIONS, S.L., Barcelona (ES)

(72) Inventors: Joaquim Lopez Mestre, Barcelona (ES); Marta Berge Garcia, Barcelona (ES)

(73) Assignee: CINERGIA POWER SOLUTIONS, S.L., Argentona (ES)

( * ) Notice: Subject to any disclaimer, the term of this patent is extended or adjusted under 35 U.S.C. 154(b) by 45 days.

(21) Appl. No.: 18/380,337

(22) Filed: Oct. 16, 2023

(65) Prior Publication Data

US 2024/0125839 A1 Apr. 18, 2024

(30) Foreign Application Priority Data

Oct. 17, 2022 (ES) .................................. P202230892

(51) Int. Cl.
*G01R 31/14* (2006.01)
*G01R 1/20* (2006.01)
*G01R 31/01* (2020.01)

(52) U.S. Cl.
CPC ............... *G01R 31/01* (2013.01); *G01R 1/20* (2013.01)

(58) Field of Classification Search
CPC ........... G01R 31/01; G01R 31/40; G01R 1/20
See application file for complete search history.

(56) References Cited

U.S. PATENT DOCUMENTS 12,040,656 B2 * 7/2024 Klepacki ............... F02B 63/048
2008/0312855 A1 12/2008 Monti et al.
(Continued)

FOREIGN PATENT DOCUMENTS

CN 111079315 A 4/2020
CN 111368438 A 7/2020
(Continued)

OTHER PUBLICATIONS

Sreejith, M.R. et al., "Electrical source emulation using modular multilevel converter", 2014 IEEE International Conference on Power Electronics, Drives and Energy Systems (PEDES), Dec. 16, 2014.
(Continued)

*Primary Examiner* — Thang X Le
(74) *Attorney, Agent, or Firm* — The Webb Law Firm (57) ABSTRACT

An emulator system for testing an electrical product in a closed circuit, including a first power electronic structure to emulate a voltage source, connectable to the input of the electrical product; a second power electronic structure to emulate an electronic load, connectable to the output of the electrical product; a direct current bus connected between the first and second structure; a power supply configured to be connected to a general electrical grid and power the bus; and a control module in communication with all elements of the system. Once the electrical product is connected between the emulated source and load, a closed circuit is established in which the emulated source consumes power from the bus to test the product and the emulated electronic load reinjects the power consumed into the bus.

11 Claims, 8 Drawing Sheets

(56) References Cited

U.S. PATENT DOCUMENTS

| | | | | |
|---|---|---|---|---|
| 2010/0308857 A1* | 12/2010 | Saniter | ................. | G01R 31/343 |
| | | | | 324/764.01 |
| 2012/0105072 A1* | 5/2012 | Peterson | ................ | G01R 31/42 |
| | | | | 324/511 |
| 2012/0133389 A1* | 5/2012 | Schroeder | .............. | G01R 31/42 |
| | | | | 324/764.01 |
| 2013/0286521 A1* | 10/2013 | Park | ....................... | H02H 7/268 |
| | | | | 361/57 |
| 2014/0172343 A1 | 6/2014 | Pelz et al. | | |
| 2018/0138740 A1* | 5/2018 | Churnock | ............... | H02J 9/062 |
| 2020/0191879 A1* | 6/2020 | Hsu | ........................ | G01R 31/42 |
| 2021/0242680 A1 | 8/2021 | Wang et al. | | |
| 2021/0288518 A1* | 9/2021 | Budde | ..................... | H02J 9/062 |
| 2022/0209545 A1* | 6/2022 | Wang | .................... | B60L 3/0069 |
| 2022/0214406 A1* | 7/2022 | Rudloff | .................. | H02M 1/36 |
| 2023/0288494 A1* | 9/2023 | Goldenbaum | .......... | H02J 3/381 |

FOREIGN PATENT DOCUMENTS

| | | |
|---|---|---|
| CN | 115166571 A | 10/2022 |
| TW | 200538745 | 3/1994 |
| TW | 201209568 A1 | 3/2012 |

OTHER PUBLICATIONS

Grass, Norbert et al., "Full Scale Power Quality Emulation System for Testing of Low Voltage Grid Components", ENERGYCON 2014, May 13-16, 2014, Dubrovnik, Croatia.

* cited by examiner

FIG.1 (STATE OF THE ART)

FIG.2 (STATE OF THE ART)

FIG.3 (STATE OF THE ART)

FIG.12 (STATE OF THE ART)

SYSTEM FOR TESTING ELECTRICAL PRODUCTS IN A CLOSED CIRCUIT

CROSS-REFERENCE TO RELATED APPLICATION

This application claims priority to Spanish Patent Application No. P202230892 filed Oct. 17, 2022, the disclosure of which is hereby incorporated by reference in its entirety.

BACKGROUND OF THE INVENTION

Field of the Invention

The present invention generally relates to the technical field of testing systems for electrical equipment and more specifically to systems that allow electrical tests to be carried out with respect to design, production or standards on products that are connected to electrical grids and which power electrical loads, such as electric car chargers or photovoltaic inverters.

Description of Related Art

Currently, when a manufacturer creates a product that has to be connected to the electrical grid or to a direct current voltage source (batteries, for example), they need a programmable voltage source in the developmental process as well as in the subsequent manufacturing process. With this programmable voltage source the new product can be subjected to the different configurations the public electrical grid may have (different voltages, different grid frequencies, different disturbances that may occur, etc.). These tests are carried out either to be able to develop a product that can be connected in different countries with different electrical grids or, for example, to carry out tests required by electricity regulations in each country in order to sell the product.

Furthermore, if the product being developed or produced by the manufacturer is a device that will power electrical loads, such as electric car chargers, UPSs (Uninterruptible Power Supply), battery chargers, electric cables, home chargers (for mobiles, laptops, etc.), electrical switchgear (plugs, circuit breakers, fuses, electric metres, etc.), photovoltaic inverters, transformers, etc., in order to be able to subject the product to the nominal operating conditions (full load) thereof and be able to perform tests with respect to design, production or standards required by said product, it is required to have an electrical load, alternating or direct, in accordance with each product.

There may be three types of electrical loads for performing tests on products: 1) The product itself that will be powered during the useful life thereof: for example, an electric car, in the case of an electric car charger. In this case it would be required to discharge the car every time a new test is required; 2) A passive load that emulates the product to be powered: for example, resistors and capacitors that consume the same as an electric car. In this case, the energy and power required for each test are consumed by the electrical grid and burned in the resistors. However, not all types of loads can be emulated with passive loads, since an electric car, for example, goes through a complete charging process of its battery and does not experience constant consumption. Other loads are non-linear and cannot be emulated with passive elements. 3) A regenerative electronic load: this device consumes the same power and energy as any electrical product by means of power electronics. It can reproduce the consumption of an electric car, a house, a building, or whatever is required. The power and energy consumed is reinjected into the electrical grid that it is connected to and therefore the overall electrical consumption of the test can be reduced by approximately 80%.

Figure 1:
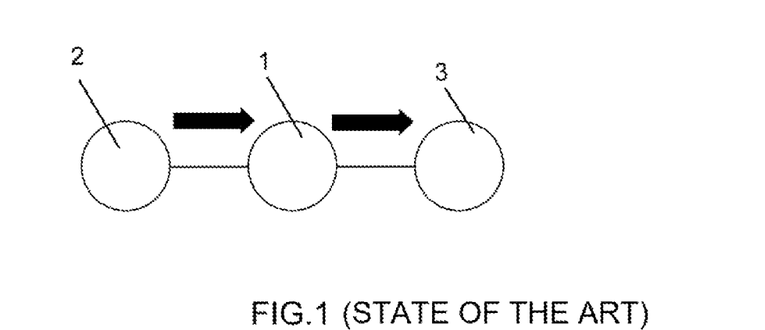
FIG. 1 (state of the art) shows the state of the art for the case of a test in real conditions of an electrical product.
Figure 2:
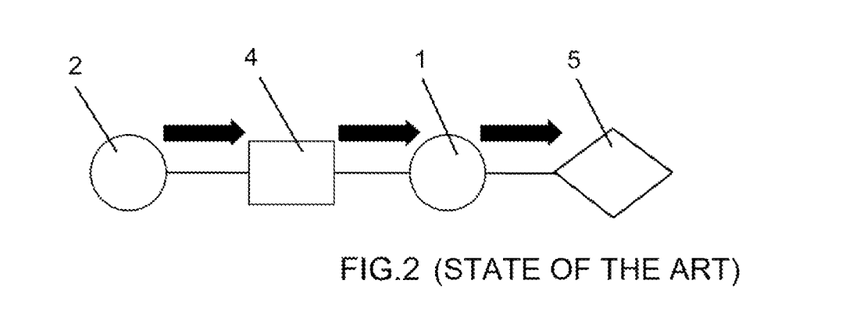
FIG. 2 (state of the art) shows the state of the art for the case of a test in emulated conditions using a programmable voltage source and passive components receiving charge.
Figure 3:
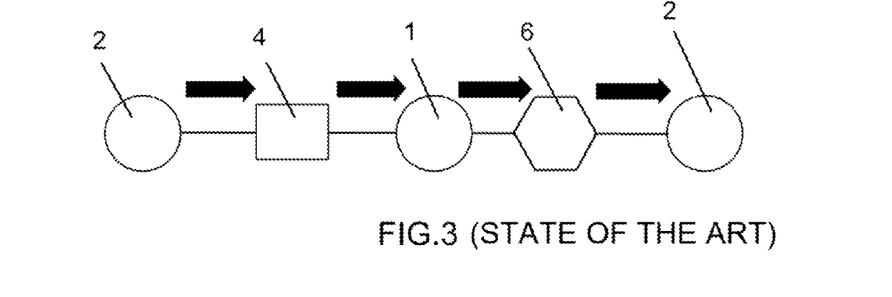
FIG. 3 (state of the art) shows the state of the art for the case of a test in emulated conditions using a programmable voltage source and electronic load receiving charge.

This results in the three possible cases for carrying out tests that are represented in FIGS. 1-3 and described below.

FIG. 1 represents a test case A) in real product conditions. In this case the manufacturer puts the product 1 in the same conditions that the end user will use. The test product 1 is connected to the same electrical grid 2 and to the same actual load 3. In the case of the electric car charger, the same would be connected to the public electrical grid and to a real electric car. In this case the manufacturer can only test one grid and charging situation. It is very complex or even impossible to have all the possible grids or carry out all the electrical disturbances required by electricity regulations, as well as to have all the possible loads that the user could connect to the product. In the example of the electric car charger, the manufacturer needs to have access to the different grids of different countries, as well as all the electric car models on the market. In this case, with respect to energy, the test requires all the nominal power of the product, as well as the total electrical energy consumption.

FIG. 2 represents test case B) in emulated conditions using a programmable voltage source 4 (interleaved between the electrical grid 2 and the test product 1) and passive components 5 receiving charge. In this case, the manufacturer puts the product in the same conditions as the end user but emulates both the source and the load. The emulation of the source is carried out using a programmable source that allows different situations of voltage, frequency, etc. to be created which can appear to the end user of the product, as well as disturbances to be used for regulatory tests required for each product. The electrical charging is done using passive charging platforms that emulate the final charge of the product. However, not all types of loads can be emulated with passive loads, since, for example, an electric car goes through a complete charging process of its battery and does not have constant consumption. Other loads are non-linear and cannot be emulated with passive elements. In this case, with respect to energy, the test requires all the nominal power of the product, as well as the total electrical energy consumption.

FIG. 3 represents a third case C) of testing in emulated conditions by means of a programmable voltage source and electronic load receiving charge. In this case, the manufacturer puts the product in the same conditions as the end user, but electronically emulates the source and load. In other words, a programmable source 4 is interleaved between the electrical grid 2 and the test product 1 and, in turn, an electronic load 6 is placed between the test product 1 and the electrical grid 2. Thus, tests can be carried out with the electrical grid conditions that are required at all times and also any type of linear or non-linear, static or changing load can be reproduced, which reproduces the entire process the final product will perform with the user, as well as the regulatory tests required. It is a much more complete type of test than cases A and B and much more dynamic, consisting of tests that the other methods A and B do not allow. In this case, with regard to energy, the test requires the entire nominal power of the product, electrical installation and switchgear of nominal power. With respect to energy, if the electronic load is regenerative, it only consumes the losses of the equipment of the electric company, able to obtain a reduction in energy consumption of approximately 80%. This reduction is due to the fact that both the programmable source 4 and the electronic load 6 are considered to have a 90% efficiency and therefore each have a 10% loss (20% in total). This 20% is what is finally consumed by the electric company (80% less than in cases A and B).

The state of the art therefore offers diverse solutions for testing electrical equipment, which vary in efficiency and performance and which are a constant challenge that call for a continuous search for more efficient solutions that mainly allow energy to be saved. In this sense, any small advance in this field is a great technical challenge and technological achievement.

SUMMARY OF THE INVENTION

With the aim of providing a solution with greater energy efficiency than those mentioned above in the state of the art of power equipment testing and measurement systems, wherein the devices that are connected to an electrical grid (alternating or direct) and power a system or electrical load require a system that reproduces both the sources and the loads to which said devices will be connected in operation, the present invention proposes, in a first aspect, an emulator system to test an electrical product in a closed circuit that comprises:

- a first power electronic structure to emulate a voltage source connectable to the input of the electrical product to be tested;
- a second power electronic structure to emulate an electronic load connectable to the output of the electrical product to be tested;
- a direct current bus connecting the first power electronic structure and the second power electronic structure;
- a power supply configured to be connected to a general electrical grid and to power the direct current bus; and
- a control module;
- wherein once the electrical product to be tested is connected to the first power electronic structure and the second power electronic structure, a closed circuit is established in which the first power electronic structure consumes power from the bus to test the electrical product and the second power electronic structure reinjects the power consumed into the bus.

The power supply is envisaged to provide the direct current bus with an amount of power that compensates for an imbalance between the power consumed from the bus and the power reinjected into the bus. Thus, advantageously, the energy balance of the system is balanced by providing a minimum amount of power, which is reduced to the losses due to the effect of heat inherent in any system.

In one embodiment of the invention, the system comprises a surrounding casing that houses the rest of the elements inside the same. Thus, advantageously, all the features of the system are provided in a single device, with the advantages of saving space and materials.

According to one embodiment of the invention, the power supply is a unidirectional supply comprising an isolation transformer and an AC/DC power supply block. Thus, advantageously, a power supply is provided without active elements (controlled semiconductors) or input filters. Specifically, the AC/DC power supply block is envisaged to implement a classification selected between diode rectifier, thyristor rectifier or switching source.

According to one embodiment of the invention, the direct current bus comprises a plurality of high-capacity capacitors connected in series-parallel. Alternatively, for cases in which the test products, or equipment being tested, require an input that is electrically isolated from the output thereof, as occurs when testing a photovoltaic inverter, it is envisaged that a high-frequency isolated DC/DC converter be interleaved in the direct current bus, thus functionally dividing said direct current bus into two buses electrically isolated from each other.

In one embodiment of the invention, the first power electronic structure is a bidirectional power structure configured to emulate an alternating current voltage source, comprising a DC/AC inverter connected in series to an output filter. Alternatively, it is envisaged that the first power electronic structure implements a bidirectional power structure configured to emulate a direct current voltage source, comprising a DC/DC converter connected in series to an output filter. Thus, advantageously, in each case it is possible to choose equipment specifically dedicated to the alternating current or direct current conditions of a specific product and test.

Optionally, it is also envisaged in one embodiment that the first power electronic structure is a bidirectional power structure configured to emulate a voltage source, which further comprises a mode selector configured to select between alternating current or direct current. Thus, advantageously, a system is provided in a single device that is valid for both possible cases of alternating current or direct current that a test product may require.

In one embodiment of the invention, the second power electronic structure is a bidirectional power structure configured to emulate an alternating current electronic load, comprising a DC/AC inverter connected in series to an output filter. Alternatively, it is envisaged that the second power electronic structure is a bidirectional power structure configured to emulate a direct current electronic load, comprising a DC/DC converter connected in series to an output filter. Thus, advantageously, in each case it is possible to choose equipment specifically dedicated to the alternating current or direct current conditions of a specific product and test.

Optionally, it is also envisaged in one embodiment that the second power electronic structure is a bidirectional power structure configured to emulate an electronic load, which further comprises a mode selector configured to select between alternating current or direct current. Thus, advantageously, a system is provided in a single device that is valid for both possible cases of alternating current or direct current that a test product may require.

The control module, according to one of the embodiments of the invention, is connected to all elements of the system. Additionally, the control module comprises its own power supply, a central processor, a communications module and an interface module.

In accordance with all of the foregoing points, the present invention has several advantageous effects compared to the state of the art, the main one of which is the possibility to perform the same types of tests with a reduction in the amount of equipment required. In other words, the state of the art requires at least two pieces of equipment to perform any of the common tests for an electrical product, specifically a first piece of equipment connected to the input of the product to be tested and a second piece of equipment connected to the output of the product to be tested. However, the system of the present invention allows only one piece of equipment to be used to test both the electrical source and the electrical load, integrating both functions in an ingenious configuration. This reduction of equipment and the integration of all of the functions of the process in a single piece of equipment has the advantage in that, apart from the reducing the amount of space required for the tests, it also reduces the amount of power and energy required to carry out the tests in the user's facility, said reduction potentially reaching 90% in power and 50% in energy. Additionally, the electrical installations and switchgear required to perform high voltage and power tests are greatly simplified, since a low-power single-phase electrical grid is sufficient to power the system of the present invention for any type of test.

BRIEF DESCRIPTION OF THE DRAWINGS

The terms FIG., FIGS., Figure, and Figures are used interchangeably to refer to the corresponding figures in the drawings.

As a part of the explanation of at least one preferred embodiment of the present invention, the following figures have been included which, by way of illustration and not limitation, represent the following.

THE REFERENCES USED IN THE FIGURES ARE LISTED BELOW

1. Test product
2. Electrical grid
3. Actual load
4. Programmable voltage source
5. Passive components receiving charge
6. Electronic load
7. Test module of the present invention
10. Control module
11. Power electronic structure for voltage source emulation
12. Power electronic structure for electronic load emulation
13. Bus power supply
14. Direct current bus
15. Output power of the system of the present invention
16. Input power of the system of the present invention
17. Power losses from the electrical grid compensated by the bus power supply
18. Isolation transformer
19. AC/DC power supply block
20. High-capacity capacitors
21. High-frequency isolated DC/DC converter
22. Isolated bus
23. Isolated bus
24. Alternating current AC voltage source
25. Direct current DC voltage source
26. DC/AC inverter
27. DC/DC converter
28. Output filter
29. DC/AC inverter
30. DC/DC converter
31. Output filter
32. Analogue adaptation block
33. Excitation adaptation block
34. Control module power supply
35. Central processor
36. Communications module
37. Interface module
38. Electric vehicle charger
39. Charger input connection
40. Charger output connection
41. Three-phase AC electrical grid emulator
42. Three-phase AC electronic load emulator
43. Single-phase grid 230V
100. Grid emulator (state of the art)
101. Electronic load (state of the art)
102. European standard power grid
103. Emulated grid
104. Electric car charger (state of the art)
105. Three-phase converter (state of the art)
106. Bus (state of the art)
107. Output inverter (state of the art)
108. Output filter (state of the art)
109. Bus (state of the art)
110. Low power single-phase grid

DESCRIPTION OF THE INVENTION

A detailed embodiment of the closed-circuit electrical product testing system of the present invention is described below, with support from the figures.

Figure 4:
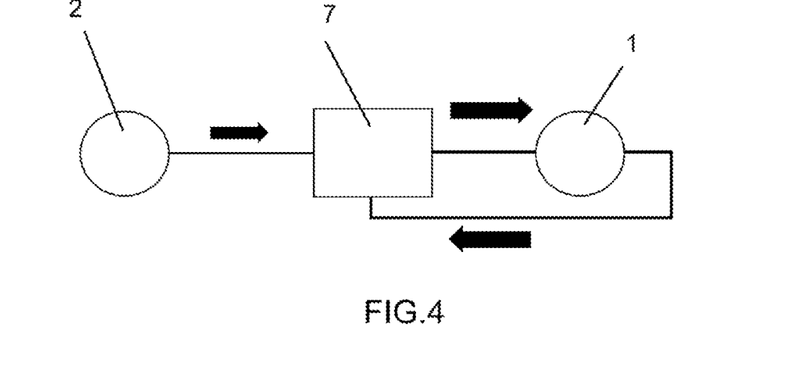
FIG. 4 functionally represents the system of the present invention.

FIG. 4 functionally represents the system of the present invention, showing a single test module 7 interleaved between the electrical grid 2 and the test product 1 which combines the functionalities of a programmable source and a regenerative electronic load. The configuration resulting from the direct connection of the test module 7 to the test product 1 is a closed loop, wherein most of the nominal power of the test product consumed is reused in the loop thanks to the closed loop of this configuration. The energy balance is not perfect in actual conditions, since losses of approximately 10% are estimated, resulting in an estimated equipment performance of around 90%. Therefore, despite certain losses, the results are at least 50% more efficient than those obtained by the best of the configurations known in the state of the art for tests under emulated conditions using a programmable voltage source and electronic load charging, wherein for the same estimated performance of 90% for the equipment, the losses would be at least 20%. Therefore, the electrical configuration resulting from the present invention is especially advantageous in terms of the energy efficiency thereof.

Figure 5:
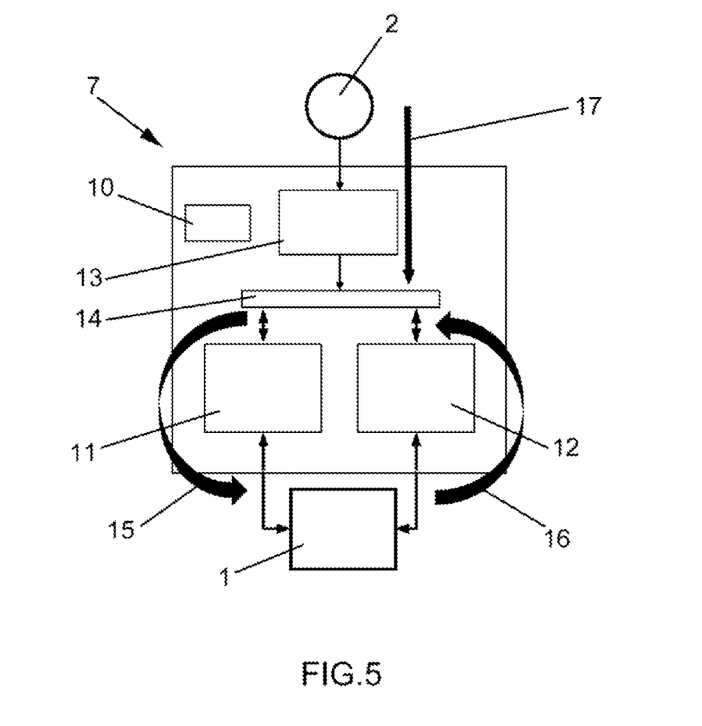
FIG. 5 represents the functional blocks of the test module of the present invention.

FIG. 5 lowers the detail level in the test module 7 to represent the functional blocks in greater detail. The system mainly comprises two functionally differentiated parts: a control part, which basically comprises a control module 10, and a power part that in turn comprises three large general blocks, which may be summarised as: power electronic structure for voltage source emulation 11, power electronic structure for electronic load emulation 12 and power electronic structure to power the system based on the electrical grid formed by a bus power supply 13 and corresponding direct current bus 14. The test product 1 connects the voltage source emulation structures 11 and electronic load emulation 12. In this configuration, the system of the present invention causes test power to flow between the test module 7 and the test product 1, exiting the structure that emulates the voltage source 11 and entering again through the structure that emulates the electronic load 12. In this way, the energy to power the test product or equipment being tested is the same as that which entered as a load. Thus, the energy balance between the output power 15 and input power 16 is practically balanced, meaning both powers 15, 16 are almost the same. The difference between the output power 15 and input power 16 to the load are the losses of the structures that emulate the voltage source 11 and electronic load 12, as well as those of the test product 1 or equipment being tested. This difference (normally 10% of the power provided) is the energy 17 provided by the power supply 13 of the direct current bus 14 to compensate for the losses.

Figure 6:
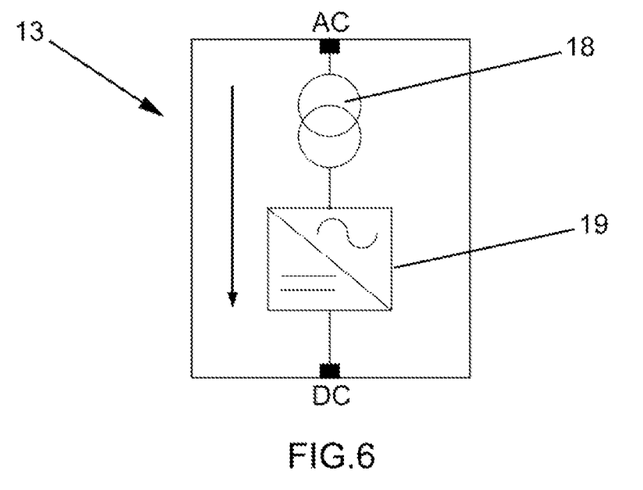
FIG. 6 represents an embodiment of the bus power supply of the present invention in block diagrams.

FIG. 6 shows an embodiment of the bus power supply 13, which is unidirectional, meaning the power and energy only flow in the direction of the electrical grid 2 to the direct current bus 14. A transformer 18 is included so as to isolate the equipment from the electrical grid if the test so requires and an AC/DC power supply block 19 is arranged after it. The specific classification of the supply block is selected from the usual ones, such as diode rectifier, thyristor rectifier or switching source. The main function of bus power supply 13 is to maintain the bus voltage 14 at a fixed value that is suitable for the proper functioning of the voltage source emulator structures 11 and electronic load 12. The bus power supply 13 absorbs energy from the electrical grid in the form of alternating current (AC) and transforms it into a direct current (DC) voltage that it injects into the bus 13. Given that the voltage, frequency and input configuration for the system vary depending on the electrical grid of each country, the bus power supply 13 is designed to adapt to these different voltages (for example 100V/115V/120V/127V/230V/295V), frequencies (for example 50 Hz or 60 Hz) and configurations (for example single-phase, three-phase or split phase), to maintain the same constant DC voltage in the bus, for example between 700-900V.

Figure 7:
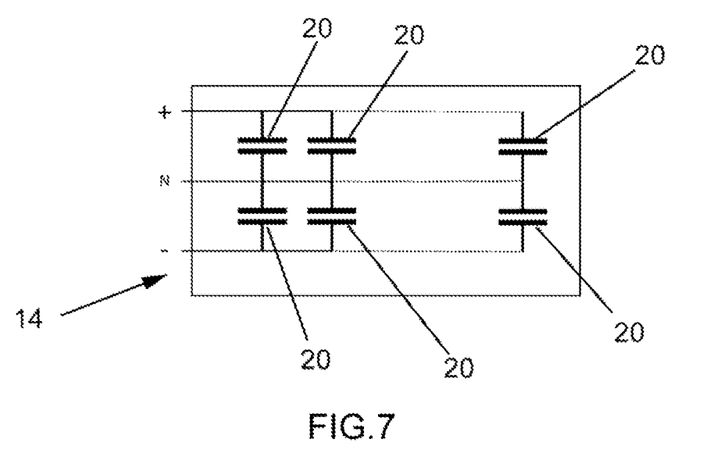
FIG. 7 represents an embodiment of the direct current bus of the present invention in block diagrams.

FIG. 7 shows an embodiment of the direct current bus 14, which is composed of a block of high-capacity capacitors 20 connected in series-parallel. One of the main functions thereof is to provide stability to the voltage and allow disturbances that may arise from transient imbalances produced during testing. The direct current bus 14 is directly connected to the voltage source emulator structures 11 and electronic load 12, thereby achieving an automatic power flow without the need to use active elements, improving the efficiency of the system.

When the voltage source emulator structure 11 supplies power to the test product 1 or equipment being tested, it consumes that bus power 14, instantly causing the bus voltage to drop. Immediately, the electronic load emulator structure 12 injects the same power that has been consumed to the bus 14 (once it has already passed through the test product or equipment being tested) instantly increasing the bus voltage 14. This drop and rise in voltage due to power flows is compensated in a matter of micro seconds, leaving the bus 14 without a variation in voltage and, therefore, power.

Given that in practice the systems are not ideal, the losses in the electrical system cause part of the electrical energy circulating to be transformed into heat. Losses in the form of heat mean that the power consumed of the bus 14 by the source emulator structure 11 is a bit greater than that which is injected by the load emulator structure 12. This makes it so the balance in the bus 14 is not completely cancelled, and therefore the bus voltage 14 tends to drop. This voltage drop is what the bus power supply 13 has to compensate for by absorbing energy from the electrical grid 2 and injecting it into the bus 14 to balance it with a constant voltage, thus compensating for the imbalance between emulated source and load that cause the losses.

Figure 8:
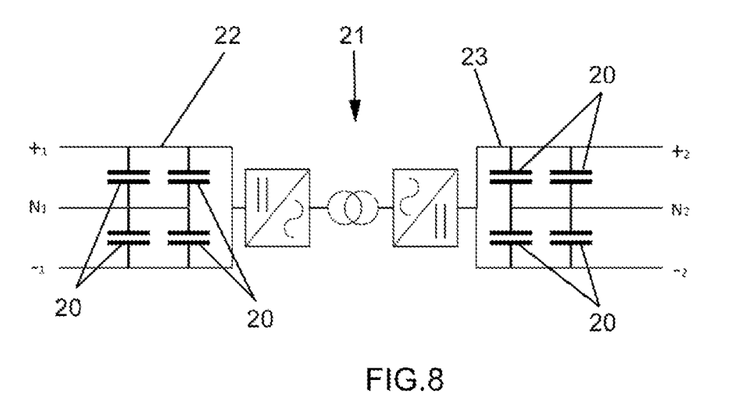
FIG. 8 represents an alternative embodiment of the isolated direct current bus in block diagrams.

FIG. 8 shows an alternative embodiment of the isolated direct current bus. Foreseeing that the test products or equipment being tested require an input that is electrically isolated from the output thereof, as occurs when testing a photovoltaic inverter, the direct current bus has an interleaved DC/DC converter 21 isolated at a high frequency to generate in practice two buses 22, 23 that are isolated from each other. Thus, depending on the type of test to be performed, the connections of the two buses 22 and 23 will vary between a first configuration, in which the bus power supply 13 and voltage source emulator structure 11 connect to the first bus 22, while the electronic load emulator structure 12 connects to the second bus 23; and a second configuration in which the bus power supply 13 and the electronic load emulator structure 12 connect to the first bus 22, while the voltage emulator structure 11 connects to the second bus 23.

Figure 9:
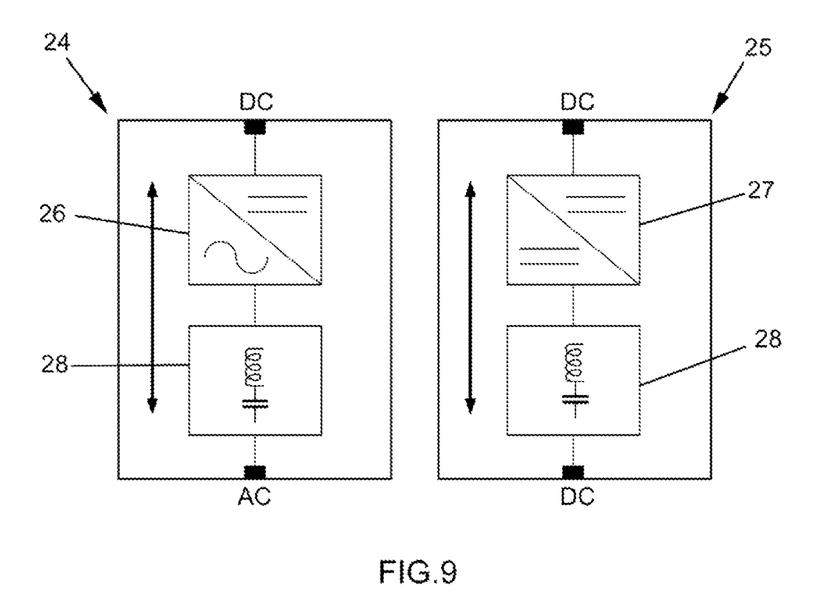
FIG. 9 shows two alternative embodiments (AC case and DC case) of the voltage source emulator structure according to a voltage source inverter configuration.

FIG. 9 shows two alternatives (AC case and DC case) of the voltage source emulator structure 11 according to a voltage source inverter configuration. Starting from a fixed direct voltage, the voltage source inverter reproduces about 700-900V, an electrical grid with the features the user programs (voltage, frequency, harmonic content, phase shift, disturbances, etc.). The emulation of an alternating current AC voltage source 24 is thus envisaged as a direct current DC voltage source 25. According to different embodiments of the invention, the voltage source emulator structure 11 comprises circuitry to emulate only one of the two options (AC or DC), or to emulate both options (AC and DC), and thus a mode selector is additionally provided to choose AC or DC in the same equipment, according to the user's interest and the features of the product to be tested. The source emulator is composed of two parts, a DC/AC inverter 26 in the case of an AC voltage source emulation 24 (which in the case of emulation of a direct current DC voltage source 25 is a DC/DC converter 27) and an output filter 28. Both the DC/AC inverter 26 and the DC/DC converter 27 are implemented using switching technology, both being bidirectional in power. The output filter 28 adapts the voltage synthesised by the switched elements of the inverter 26 or converter 27 reducing the harmonic content thereof to achieve the voltage requirements the user needs for the test.

Figure 10:
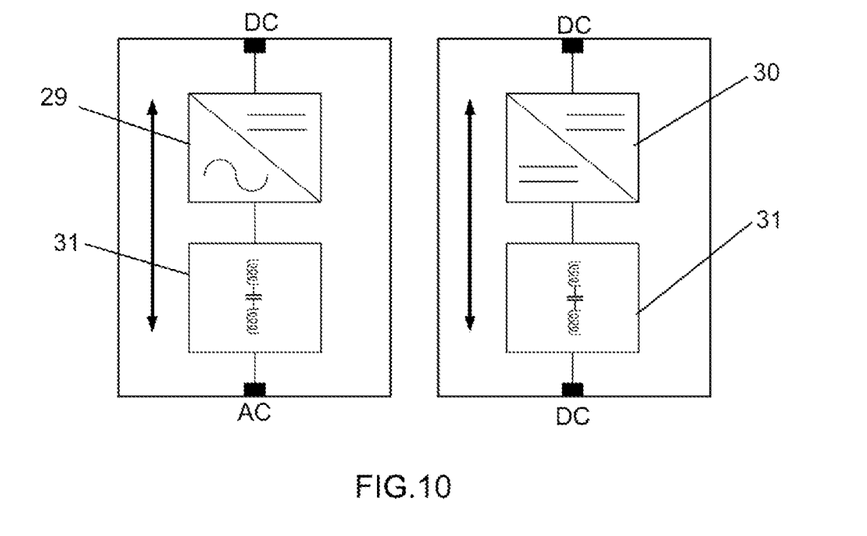
FIG. 10 shows two alternative embodiments (AC case and DC case) of the electronic load emulator structure also according to an inverter configuration.

FIG. 10 shows two alternatives (AC case and DC case) of the electronic load emulator structure 12, also according to an inverter configuration. The electronic load emulator structure is connected to the direct current bus with a fixed voltage at the input thereof and at the output of the test product or equipment being tested, being bidirectional in power so as to be able to reinject the power consumed in the test product to the direct current bus. The electronic load emulator structure is, in practice, a source, the main function of which is to consume (or inject) controlled current into a voltage source. This source can be in either an AC (alternating current) or DC (direct current) format. By controlling the current that is consumed or injected into the voltage source, any electrical load, both AC and DC, can be reproduced. According to different embodiments of the invention, the electronic load source emulator structure 12 comprises circuitry to emulate only one of the two options (AC or DC), or to emulate both options (AC and DC), so that a mode selector is additionally provided to choose AC or DC in the same equipment, according to the user's interest and the features of the product to be tested. The electronic load emulator 12 is made up of two parts, a DC/AC inverter 29 (or a DC/DC converter 30, in the case of direct current) and an output filter 31. The output filter 31 is predominantly inductive for good current control.

Figure 11:
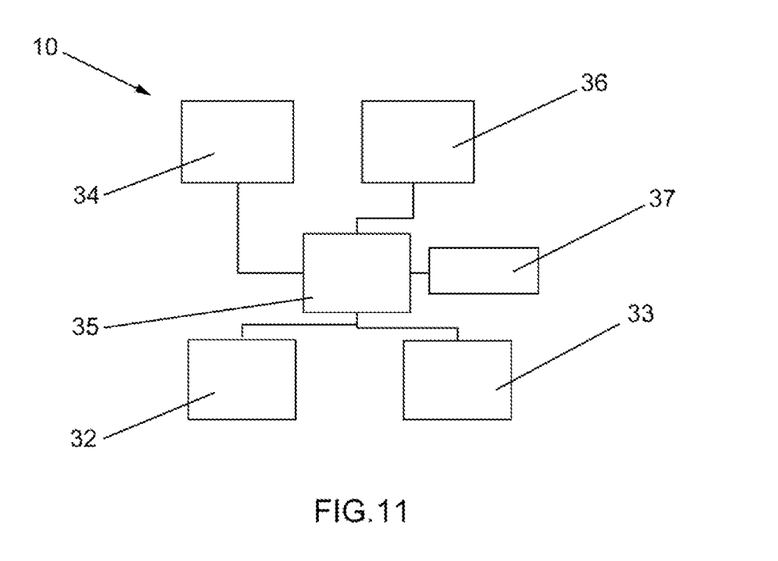
FIG. 11 shows a diagram of functional blocks that represent the control module.

FIG. 11 shows a diagram of functional blocks that represent the control module 10. The control module is responsible for controlling the rest of the system modules, to which it is operationally connected in order to facilitate the reception of information from each of them (such as analogue readings, component status or alarms) and it can also send the different required control commands (such as PWM or manoeuvring). The control module 10 comprises certain electronic circuitry for the operation thereof, which is made up partly of digital circuitry and partly of analogue circuitry. The digital circuitry adapts all the usual digital signals (communications, input/output manoeuvring, external memories) so that the central processor 35 can interact with them, while the analogue circuitry adapts the usual analogue signals of the different sensors that can be arranged in the system (current sensors, voltage sensors, temperature sensors, etc.) to levels that the central processor 35 can read. The control module 10 specifically has an analogue adaptation block 32 which includes said analogue circuitry, and an excitation adaptation block 33 to adapt the usual firing signals of the semiconductors of the converters and inverters, which are generated in the central processor, to the controllers that govern the firing of each semiconductor. Furthermore, the control module has its own power supply 34, configured to provide independent power to the central processor 35 with the computational capacity to manage the system. Depending on the test product, there may also be communication between the control module 10 and said product 1, such as in the case where BMS communications with a battery are required, or using standard charging protocols for automobiles, such as CHAdeMO, for which the control module is provided with a specific communications module 36. Similarly, the control module is accessible by the user, mainly for manoeuvring and operational tasks from a specific interface module 37.

Figure 12:
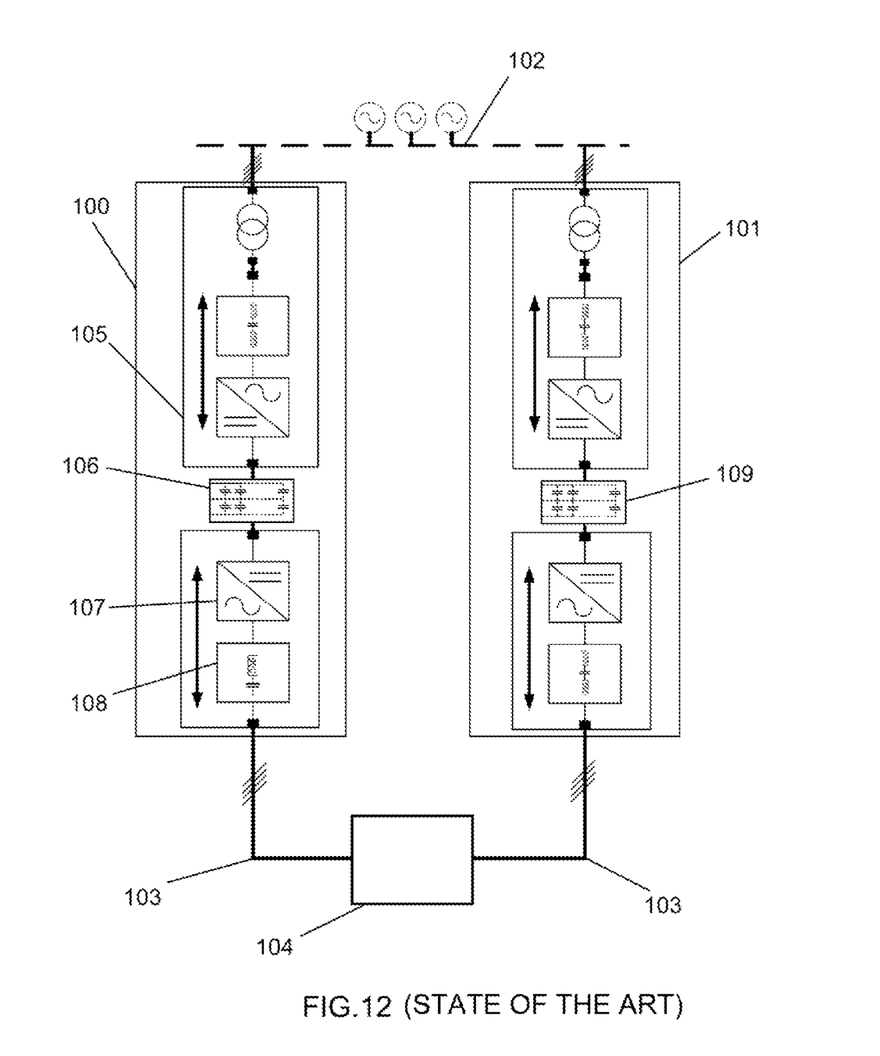
FIG. 12 (state of the art) shows a test of a three-phase power equipment, such as an electric car charger, with state-of-the-art equipment.
Figure 13:
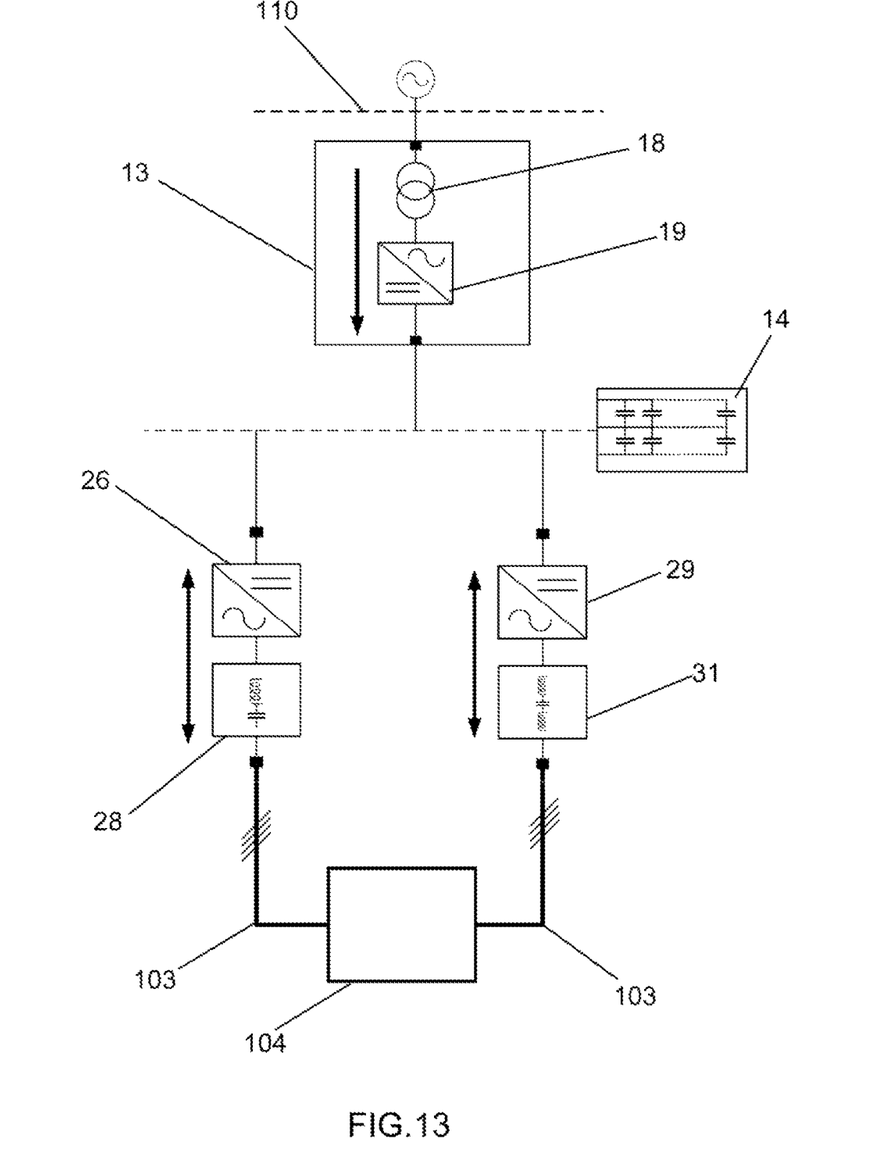
FIG. 13 shows the same test shown in FIG. 12 but with the closed circuit system of the present invention.

By way of comparison, FIGS. 12 and 13 show one of the preferred embodiments of the present invention compared to the equivalent solution of the state of the art, performing the same test and under the same conditions.

Specifically, as an example, FIG. 12 shows a test of a three-phase power device, such as an electric car charger 104, with state-of-the-art equipment. Two complete devices would be needed, a grid emulator (GE) 100 and an electronic load (EL) 101. In addition, it is currently required to have a grid (or a part of the installation) of the total power, and thus this example uses the standard power supply in Europe, a three-phase grid 102 at 400V and 50 Hz. The emulated grid 103 could imitate that of any country of interest for the test, meaning it could be adjusted for example to 380V or to 60 HZ, but in this case the assumption will continue to be that the grid of interest is the European grid, three-phase at 400V and 50 Hz. Although in this case the grid values (voltage and frequency) of the general grid and the emulated grid coincide, it is still required to interleave the grid emulator, since it is where all the test events will be simulated, such as transient voltage drops, transient voltage surges, or momentary frequency changes, generally known as grid disturbances, to test in the equipment. The grid emulator 100 of the state of the art comprises a three-phase converter 105 to be connected to the 400V three-phase public electrical grid, wherein said three-phase converter, which requires a special filter, is known as ActiveFrontEnd or AFE, which implies active elements (controlled semiconductors) of a certain degree of complexity in the operation thereof. The AFE connects to a bus 106 it shares with an output inverter 107 and an output filter 108. The electronic load emulator 101 of the state of the art basically has the same configuration as the source emulator, and thus no further explanation thereof will be required here, except to once again highlight the operation of the bus 108 which, just as in the grid emulator, is configured to connect two converters, the AFE and the inverter, such that the power flow always goes exclusively from one to the other.

In contrast, the FIG. 13 shows the same test shown in FIG. 12 for the electric car charger 104, but with the closed circuit system of the present invention, wherein the functional blocks are practically reduced by half, thereby doubling the efficiency. In this case, the power requirement of the grid of the installation is drastically reduced (up to 90%), which even makes it possible to perform three-phase high-power tests using only a low-power single-phase grid 110, yet in this specific embodiment it is enough to use the 230V single-phase public electrical grid. The unidirectional power supply is connected 13 to the low-power single-phase grid 110, said power supply being a much simpler converter than that which is required by the state of the art and represented in FIG. 12, since it does not have active elements (controlled semiconductors) nor requires a filter at the input. It is therefore much smaller and simpler in terms of components and control (it does not have one), and it is more economical. The source 13 is connected to the direct current bus 14, which in this specific embodiment guarantees a DC voltage of 850V. In contrast to the state-of-the-art embodiment shown in FIG. 12, the direct current bus 14 is configured to connect three converters (19, 26 and 29), such that approximately 90% of the power flow flows between the two inverters (26 and 29) and the remaining 10%, caused by the usual losses of any system, is provided by the source 13 to keep the energy balance between the input and output of the system.

Figure 14:
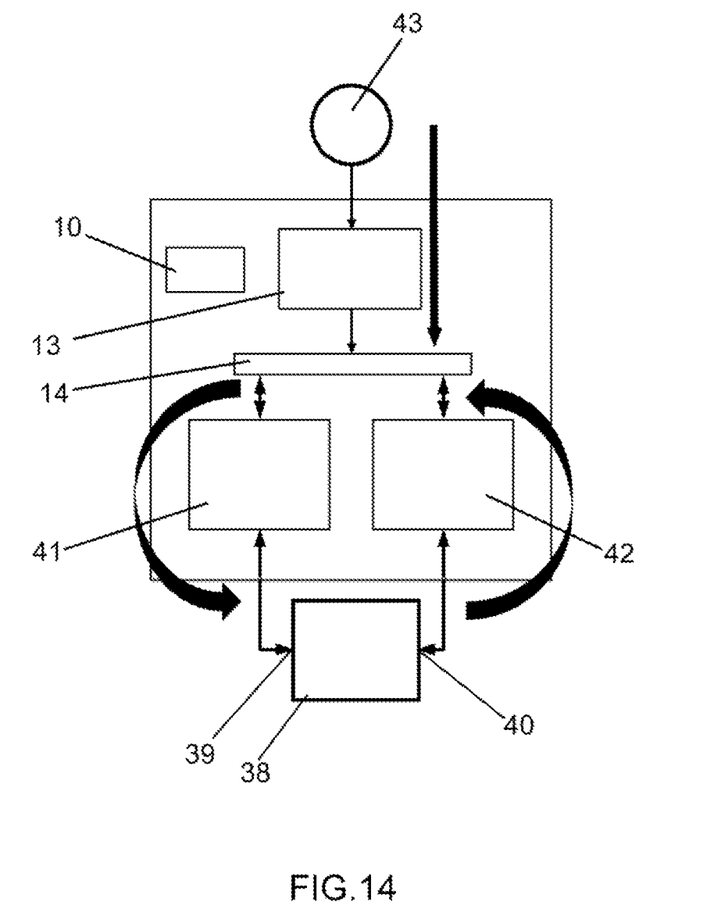
FIG. 14 shows an example of practical application of the present invention.

FIG. 14 shows an example of practical application of the present invention which relates to a system to perform the required tests for a wallbox type electric vehicle charger. Typically, an electric vehicle charger 38 of this type has two power connections, one input connection 39 for the public three-phase electrical grid (400V and 24.2 KW of power) and another output connection 40 for an electric car (22 KW of power). This specific application of the system of the present invention requires a specific configuration of the power electronic structure for voltage source emulation 11 as a three-phase AC electrical grid emulator 41 and of the power electronic structure for electronic load emulation 12 as a three-phase AC electronic load 42. In this case, the grid emulator 41 reproduces a grid of 24.2 kW maximum power with different voltages and frequencies of 50 or 60 Hz, depending on the country where the charger is to be sold. Furthermore, the electronic load 42 has to consume a three-phase sinusoidal current from the charger in the same way that the charger 38 incorporated in electric cars would do. Therefore, according to the embodiment of this application example, the system of the present invention emulates a three-phase grid of 400V and 24.2 kW of power, as well as the charging of the three-phase electric car of 22 kW of power, connecting only to one single-phase grid 43 of 230V and consuming 2.2 kW of power. In other words, the present invention, according to this practical application example, reduces the power that would be required to carry out the same test in real product conditions by 22 kW and reduces the total losses of the system to 2.2 kW, these losses being compensated by the energy flow that is absorbed by the 3 kW domestic single-phase grid. In addition, it significantly improves the usual requirements in the state of the art that entail using the electrical installation of a 30 kW three-phase grid, instead of the much more accessible 3 kW single-phase domestic grid.

The elements of the present invention that are described as "connected" should not be understood exclusively as "directly connected", but rather they may be directly connected or there may be other elements connected to each other. Therefore, when connected elements are mentioned, it can be understood that the elements are communicated, and this may be directly or through other elements.

The present invention is not limited to the embodiments described herein, but additional ones will be comprehensible for a person skilled in the art based on the present description. Accordingly, the scope of the invention is defined by the following claims.

The invention claimed is:

1. An emulator system for testing an electrical product in a closed circuit, the system comprising:
    a first power electronic structure to emulate a voltage source connectable to the input of the electrical product to be tested, wherein the first power electronic structure is a bidirectional power structure configured to emulate an alternating or direct current voltage source, which comprises a DC/AC inverter or a DC/DC converter connected in series with an inductive-capacitive passive output filter;
    a second power electronic structure to emulate an electronic load connectable to the output of the electrical product to be tested, wherein the second power electronic structure is a bidirectional power structure configured to emulate an alternating or direct current electronic load, which comprises a DC/AC inverter or a DC/DC converter connected in series to an inductive-capacitive passive output filter;
    a direct current bus connected between the first power electronic structure and the second power electronic structure, wherein the direct current bus only circulates DC current between the first power electronic structure and the second power electronic structure;
    a power supply configured to be connected to a general electrical grid and power the direct current bus; and
    a control module;
    wherein once the electrical product to be tested is connected between the first power electronic structure and the second power electronic structure, a closed circuit is established in which the first power electronic structure consumes power from the direct current bus to test the electrical product and the second power electronic structure reinjects the power consumed into the direct current bus.

2. The system according to claim 1, wherein the power supply is configured to provide the direct current bus with an amount of power that compensates for an imbalance between the power consumed from the direct current bus and the power reinjected into the direct current bus.

3. The system according to claim 2, wherein the power source is a unidirectional source comprising an isolation transformer and an AC/DC power supply block.

4. The system according to claim 1, which further comprises a casing, wherein all the elements are housed inside the casing.

5. The system according to claim 1, wherein the power source is a unidirectional source comprising an isolation transformer and an AC/DC power supply block.

6. The system according to claim 5, wherein the AC/DC power supply block comprises a classification to be selected among diode rectifier, thyristor rectifier or switched source.

7. The system according to claim 1, wherein the direct current bus comprises a plurality of high-capacity capacitors connected in series-parallel.

8. The system according to claim 7, wherein the direct current bus comprises an interleaved DC/DC converter, isolated at a high frequency, which functionally divides the direct current bus into two buses that are electrically isolated from each other.

9. The system according to claim 1, wherein the first power electronic structure further comprises a mode selector configured to select between alternating current or direct current.

10. The system according to claim 1, wherein the second power electronic structure further comprises a mode selector configured to select between alternating current or direct current.

11. The system according to claim 1, wherein the control module is connected to all elements of the system, and wherein the control module comprises its own power supply, a central processor, a communications module and an interface module.

* * * * *